Patented May 5, 1925.

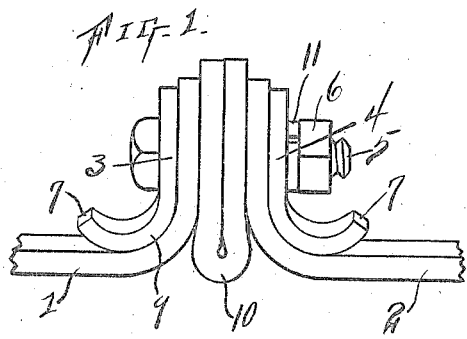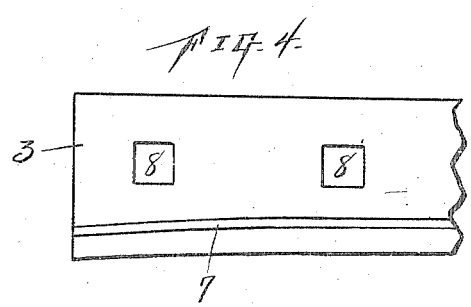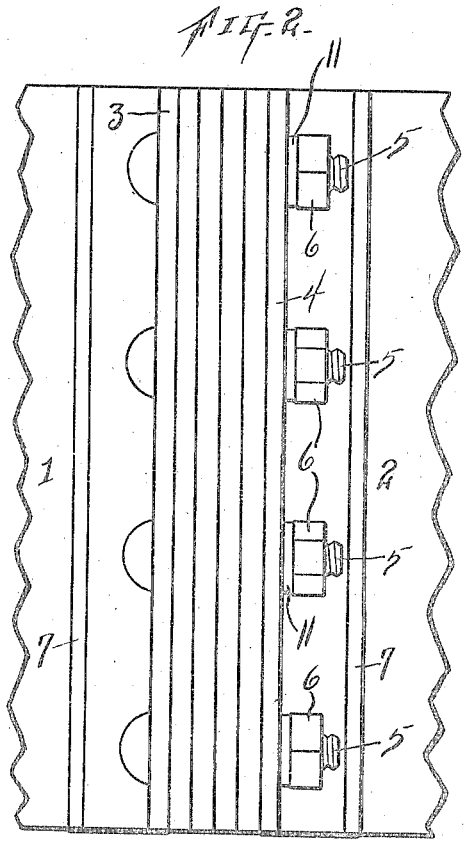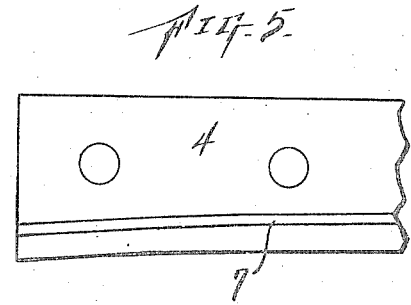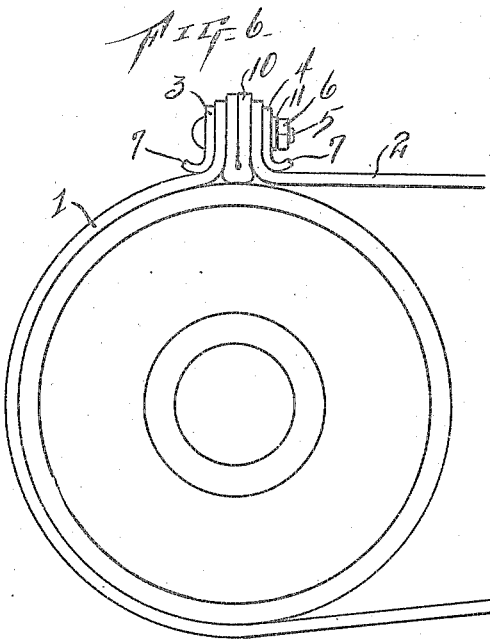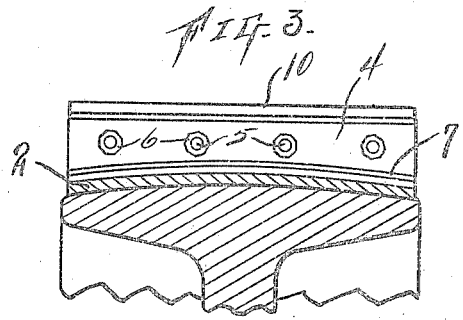

1,536,278

UNITED STATES PATENT OFFICE.

JOHN E. URSCHEL, OF MEXIA, TEXAS.

BELT CLAMP.

Application filed February 2, 1925. Serial No. 6,202.

*To all whom it may concern:*

Be it known that I, JOHN E. URSCHEL, a citizen of the United States, residing at Mexia, in the county of Limestone and State of Texas, have invented certain new and useful Improvements in Belt Clamps, of which the following is a specification.

My invention relates to belt clamps; and the object is to provide an efficient belt clamp which will securely hold the two ends of a belt without mutilating or damaging the belt, to provide clamps which will conform to the crowns of pulleys over which they travel and thereby making the strain on the belts uniform and preventing wabbling of the belts, and to provide clamps which can be quickly secured on the belts and which will last indefinitely.

Other objects and advantages will be fully explained in the following description and the invention will be more particularly pointed out in the claims.

Reference is had to the accompanying drawings which form a part of this application.

Fig. 1 is a perspective edge view of a belt with the improved clamps attached to the ends of the belt. Fig. 2 is a plan view of the same. Fig. 3 is a cross-section of a pulley rim and a belt adjacent to the clamps, showing the crown of the pulley and the clamps conforming to the contour of the pulley. Fig. 4 is a broken side elevation of one member of the clamp, showing the openings for the bolts square in cross-section. Fig. 5 is a similar view of the other clamp, showing the round openings. Fig. 6 is a side elevation of a pulley and a belt applied thereto and the improved clamp applied to the belt.

Similar characters of reference are used to indicate the same parts throughout the several views.

The drawings show the ends 1 and 2 of the belt with the clamps applied thereto. There are two clamping members 3 and 4 which engage the ends 1 and 2 of the belt, and these clamping members are secured on the ends of the belt by bolts 5 and nuts 6. The clamps 3 and 4 are rigid, being made of carbon steel and heated cherry red and then drop-forged. It is apparent that other material can be used. The extreme ends 7 are curved away from the belt so that the edges of the metal will not strike the surface of the belt, the belt merely resting against the backs of the curves. This provision will prevent mutilation of the belt during operation and also prevent the mutilation of the belt in handling the belt when the belt is not in operation. The portions 9 of the clamps 3 and 4 should have approximately the curvature of the arc of the pulleys over which the belt is traveling and the curvature of the portions 9 may be varied in the manufacture to adapt the same to the curvature of the arc of pulleys over which the belts are to be used. The object is to maintain uniform tension of the belts.

A cushioning element 10 of yielding material may be placed between the ends of the belt for protection of the belt and this element 10 will be crushed down against the pulley, as shown in Fig. 6, when passing over the pulley and this will tend to bridge the space between the adjacent portions of the belt. The clamp 3 has square openings 8 for the bolts and the clamps are secured on the ends of the belt by means of bolts 5 and nuts 6 and locking washers 11. The clamp 4 has cylindrical openings for the bolts. It is apparent that various changes in the sizes, proportions and construction of the several parts may be made without departing from my invention.

The clamps 3 and 4 are curved between their lateral edges, as shown in Figs. 3, 4, and 5 to conform to the curvature of the crowns of the pulleys over which the belt is traveling. This provision will prevent wabbling and slipping of the belt laterally and will maintain uniformity in operation.

What I claim, is,—

1. Belt clamps comprising two clamping members for engaging the ends of a belt, made of rigid material and having portions thereof curved to conform to the arc of the pulleys over which the belt is traveling and having the extreme ends of the clamps curved away from the surface of the belt, and bolts and nuts for securing the clamps on the ends of the belt.

2. Belt clamps comprising two rigid clamping members for engaging the ends of a belt, having portions thereof curved longitudinally to conform to the arc of the pulleys over which the belt is traveling and having the extreme ends curved away from the surface of the belt and having their inner faces curved laterally to conform to the curvature of the crowns of the pulleys over which the belt is traveling, and bolts and nuts for securing the clamps on the ends of the belts.

3. Belt clamps comprising two rigid clamping members for engaging the ends of a belt, having portions thereof curved longitudinally to conform to the arc of the pulleys over which the belt is traveling and having the extreme ends curved away from the surface of the belt and having their inner faces curved laterally to conform to the curvature of the crowns of the pulleys over which the belt is traveling, a cushioning element placed between the ends of the belt adapted to bridge the space between the inner curved portions of the belt when strain comes on said element, and bolts and nuts for securing the clamps on the ends of the belt.

In testimony whereof, I set my hand, this 15th day of January, 1925.

JOHN E. URSCHEL.